United States Patent
Makimoto et al.

(10) Patent No.: US 8,111,295 B2
(45) Date of Patent: Feb. 7, 2012

(54) IMAGE STABILIZER AND OPTICAL INSTRUMENT THEREWITH

(75) Inventors: Akihiro Makimoto, Miyagi (JP); Kentaro Tokiwa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 232 days.

(21) Appl. No.: 12/639,722

(22) Filed: Dec. 16, 2009

(65) Prior Publication Data

US 2010/0149354 A1 Jun. 17, 2010

(30) Foreign Application Priority Data

Dec. 17, 2008 (JP) ................... 2008-320573

(51) Int. Cl.
*H04N 5/228* (2006.01)
*G03B 17/00* (2006.01)
*G02B 27/64* (2006.01)

(52) U.S. Cl. ....... 348/208.99; 396/52; 396/55; 359/554; 359/557

(58) Field of Classification Search ............. 348/208.99; 396/52–55; 359/554–557
See application file for complete search history.

(56) References Cited

U.S. PATENT DOCUMENTS

| 7,502,554 | B2* | 3/2009 | Enomoto | 396/55 |
| 2006/0017818 | A1* | 1/2006 | Enomoto | 348/219.1 |
| 2006/0132613 | A1 | 6/2006 | Shin et al. | |
| 2006/0146400 | A1* | 7/2006 | Seo | 359/368 |
| 2007/0014555 | A1* | 1/2007 | Hirunuma et al. | 396/55 |
| 2009/0002502 | A1* | 1/2009 | Shirono | 348/208.99 |
| 2009/0002825 | A1* | 1/2009 | Morita et al. | 359/554 |
| 2009/0052037 | A1* | 2/2009 | Wernersson | 359/554 |
| 2009/0091832 | A1* | 4/2009 | Nagai et al. | 359/557 |

FOREIGN PATENT DOCUMENTS

| JP | 11-015037 A | 1/1999 |
| JP | 2000-199920 A | 7/2000 |
| JP | 2007-148023 A | 6/2007 |

* cited by examiner

*Primary Examiner* — Lin Ye
*Assistant Examiner* — Mekonnen Dagnew
(74) *Attorney, Agent, or Firm* — Sughrue Mion, PLLC

(57) ABSTRACT

A CCD support mechanism includes a CCD holder for holding a CCD, a first printed circuit board having a first printed coil, a second printed circuit board having a second printed coil, a pair of horizontal leaf springs, and a pair of vertical leaf springs. When a camera shake occurs by hand-held shooting, a VCM composed of the first printed coil and a first stationary magnet shifts the CCD, while bending the horizontal leaf springs, to counteract the camera shake in a Y-axis direction. A VCM composed of the second printed coil and a second stationary magnet shifts the CCD, while bending the vertical leaf springs, to counteract the camera shake in an X-axis direction. Current values of the VCMs are determined by feedback control by using an output signal from a shake detector as a target value and a present position from a position detector as a measurement value.

12 Claims, 7 Drawing Sheets

IMAGE STABILIZER AND OPTICAL INSTRUMENT THEREWITH

BACKGROUND OF THE INVENTION

1. Field of the Invention

The present invention relates to an image stabilizer for correcting an image blur due to hand-held shooting, and an optical instrument therewith.

2. Description Related to the Prior Art

Many optical instruments including digital still cameras have an image stabilizer or a shake correction device for correcting an image blur caused by vibration or a camera shake due to hand-held shooting. The image stabilizer is constituted of a shake detector for detecting the camera shake, a holder for movably holding an optical element such as a taking lens or an image sensor, a computing unit, an actuator for shifting the holder in a plane where the optical element is orthogonal to a photography optical axis, and a position detector for detecting the position of the optical element. The computing unit calculates which direction and how much the optical element should be shifted, based on a detection result of the shake detector such as an angular velocity sensor. The actuator performs feedback control of the position of the optical element during the camera shake, by using a calculated shift amount as a target value and a present position detected by the position detector as a measurement value.

In some conventional image stabilizers, the layout of the actuator and the position detector is devised for downsizing. According to ENOMOTO (Japanese Patent Laid-Open Publication No. 11-015037), for example, the center of an air-core coil, which is a part of the actuator, coincides with the photography optical axis. In TAKEDA (Japanese Patent Laid-Open Publication No. 2000-199920), an inner support frame slidably supports a lens frame having a shake correction lens for horizontal movement via guide shafts. An outer support frame supports the inner support frame slidably in a vertical direction via guide shafts. Linear motors as the actuator and position detection sensors as the position detector are disposed between the lens frame and the inner support frame and between the inner support frame and the outer support frame. If the linear motors are turned off while the camera shake does not occur, X-axial and Y-axial springs are provided in order to keep the optical axis of the shake correction lens aligned with the photography optical axis.

SHIN et al. (U.S. Patent Application Publication No. 2006/0132613 corresponding to Japanese Patent Laid-Open Publication No. 2006-171694) discloses an image stabilizer that shifts an image sensor in response to the camera shake for preventing occurrence of the image blur. The image stabilizer has a first frame that is slidably supported by a pair of X-axis guide shafts and a second frame that is slidable in a Y-axis direction on the first frame. The second frame holds the image sensor, and is slidably supported by a pair of Y-axis guide shafts attached to the first frame. The first frame is equipped with a linear motor, and the second frame is equipped with a voice coil motor. The linear motor and voice coil motor are disposed adjacently to each other. According to OKUMA (Japanese Patent Laid-Open Publication No. 2007-148023), a lens barrel contains a magnetic material or has a magnetic layer on its surface to function as a yoke.

In the foregoing prior art, each of the X-axis and Y-axis sliders or frames is slidably supported by a pair of guide shafts. This structure is the main impediment to downsizing of the image stabilizer. ENOMOTO and SHIN et al. have limited flexibility in the coil layout, and there are cases where the image stabilizer is difficult to downsize anymore. TAKEDA has the problem of wobble that occurs between the guide shaft and a bearing of the slider. The wobble degrades precision of the position detector. It is conceivable to dispose a spring between the guide shaft and the bearing for reducing the wobble, but friction of the spring lowers the followability of the holder to the actuator.

SUMMARY OF THE INVENTION

A main object of the present invention is to provide a small image stabilizer by negating the need for guide shafts.

Another object of the present invention is to provide an optical instrument that contains the image stabilizer in a small space.

An image stabilizer according to the present invention includes a base block fixed to an optical instrument, an optical element holder for holding an optical element (correction lens or image sensor) disposed on an optical axis of the optical instrument, a first printed circuit board attached to the optical element holder, a second printed circuit board disposed outside the optical element holder, a pair of first leaf springs, a pair of second leaf springs, and a first stationary magnet and second stationary magnet fixed to the optical instrument. The first printed circuit board has a first printed coil, and the second printed circuit board has a second printed coil. The first stationary magnet generates a magnetic field around the first printed coil. The second stationary magnet generates a magnetic field around the second printed coil. The first leaf springs are disposed in parallel with each other, and elastically deformable in a first direction in a plane orthogonal to the optical axis. Each first leaf spring is fixed to the optical element holder at an end, and to the second printed circuit board at the other end. The second leaf springs are disposed in parallel with each other, and elastically deformable in a second direction transverse to the first direction in the plane orthogonal to the optical axis. Each second leaf spring is fixed to the second printed circuit board at an end, to the base block at the other end.

A camera shake becomes a problem in taking a still image or a moving image. In taking the still image, a shutter button is pressed down while holding a digital still camera with both hands. If the camera shake occurs during the press of the shutter button, the image to be captured is blurred. The camera shake is detected by a shake detector, e.g. an angular velocity sensor. According to detected angular velocity, X-axis and Y-axis target shift amounts of the optical element are determined. The first printed coil and the second printed coil are energized in accordance with the target shift amounts. Upon energization of the first and second printed coils, Lorentz forces that occur between the first printed coil and the first stationary magnet and between the second printed coil and the second stationary magnet shift the optical element holder in the opposite direction of the camera shake, while elastically bending the first and second leaf springs. The shift of the optical element holder counteracts a move of the image formed on the image sensor due to the camera shake, so that a sharp image without a blur is captured. Upon stopping the camera shake, the energization of the first and second printed coils is stopped. In this case, the elasticity of the first and second leaf springs returns the optical element holder to its standard position. In the standard position, the center of the image sensor is aligned with the optical axis.

It is preferable that the first stationary magnet be disposed in front of the first printed coil, and the second stationary magnet be disposed in front of the second printed coil in the optical instrument.

The image stabilizer further includes the shake detector for detecting the camera shake, a position detector for detecting the position of the optical element, and a controller for controlling an electric current flowing through the first or second printed coil based on a signal from the shake detector and a position signal from the position detector.

The position detector includes a first magnetometer disposed on the first printed circuit board, a second magnetometer disposed on the second printed circuit board, and a processor circuit. The first magnetometer detects the strength and the direction of the magnetic field of the first stationary magnet. The second magnetometer detects the strength and the direction of the magnetic field of the second stationary magnet. The processor circuit calculates the position of the optical element holder in the first direction from an output signal of the first magnetometer, and calculates the position of the optical element holder in the second direction from an output signal of the second magnetometer. The electric current flowing through the first and second printed coils are determined by feedback control by using an output from the position detector as a measurement value and a target shift amount calculated based on an output from the shake detector as a target value.

It is preferable that the first and second magnetometers be Hall elements.

The image stabilizer may further include a yoke that is fixed to the optical element. To the yoke, the first and second stationary magnets are attached.

The optical element is an image sensor or a correction lens that is shifted in a two-dimensional plane to correct the camera shake.

The magnets and the printed coils may be attached to opposite positions to each other. More specifically, the magnet may be attached to the optical element holder, and the printed coil is disposed in front of the magnet.

According to the present invention, the second printed circuit board or the second drive magnet holds the optical element holder via the pair of first leaf springs. Therefore, obviating the need for a slider for holding the optical element and guide shafts for supporting the slider, which are used in the prior art, achieves reduction of the image stabilizer in size and cost. Elimination of wobble, which has occurred between the guide shaft and a bearing, allows to detect the position of the optical element with high precision.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

First Embodiment

Figure 1:
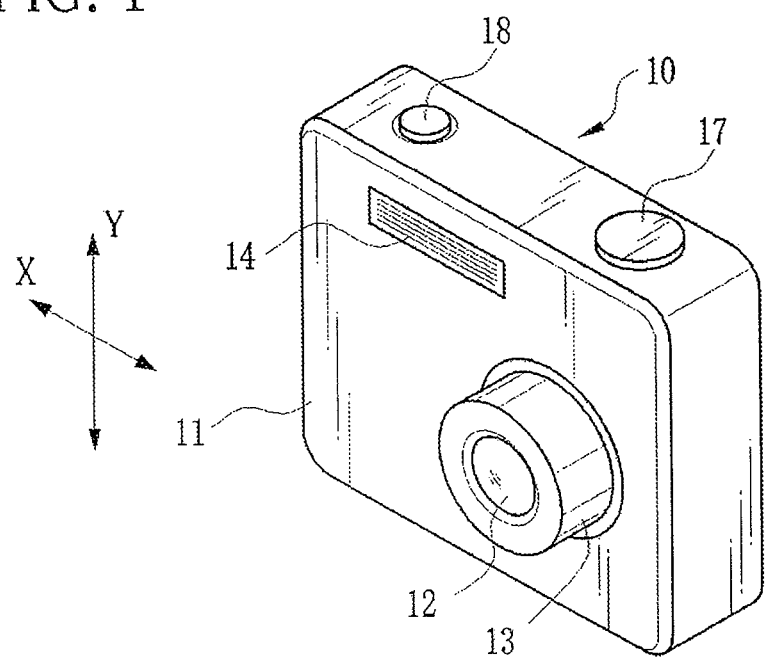
FIG. 1 is a front perspective view of a digital still camera.

As shown in FIG. 1, a digital still camera 10 has a lens barrel 13 for containing an optical system 12, a flashlight emitter 14 for applying flashlight to an object and the like in a front face of a camera body 11.

On a top face of the camera body 11, there are provided an operation dial 17 and a shutter button 18. The operation dial 17 is used for turning the power on and off, and switching an operation mode (among a photographing mode, a playback mode and the like). The shutter button 18 is a two-step push switch, and used for taking an image. Upon turning on a first-step switch SW1 by a half press of the shutter button 18, the digital still camera 10 makes preparation for image taking (exposure setting and focusing). After that, when a second-step switch SW2 is turned on by a full press of the shutter button 18, the digital still camera 10 captures a still image and stores image data on a memory card 26.

Figure 2:
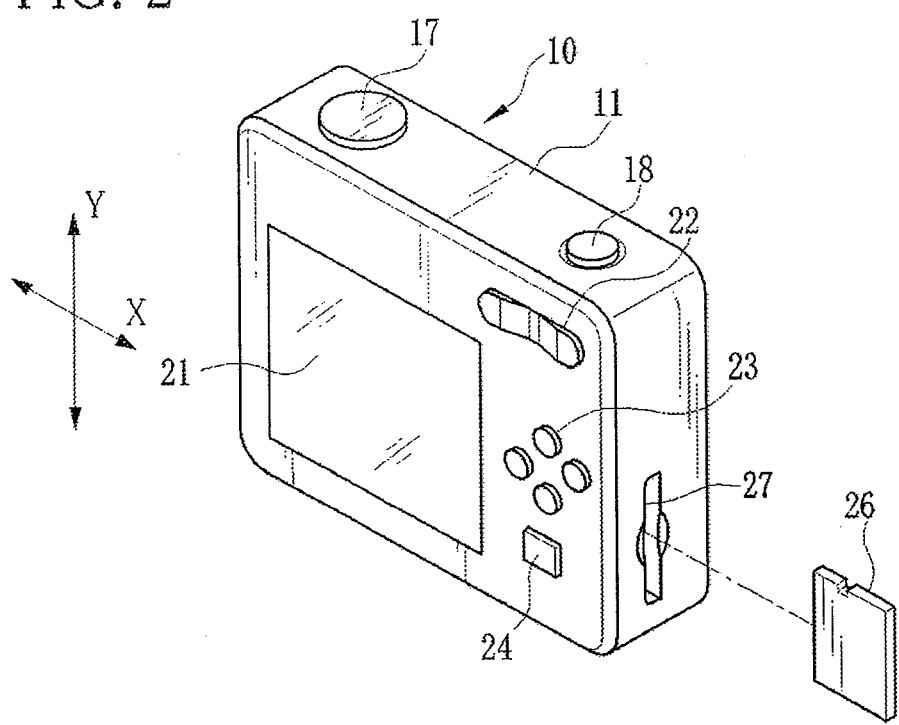
FIG. 2 is a rear perspective view of the digital still camera.

As shown in FIG. 2, a liquid crystal display (LCD) 21, a zoom button 22, a set of cursor keys 23, and a confirmation button 24 are provided on a rear face of the camera body 11. On the LCD 21, a live image, a playback image, a setting menu screen or the like is displayed in response to the chosen operation mode. The zoom button 22 is used for optically or digitally varying zoom magnification. The cursor keys 23 are used for changing settings, or choosing an item from the setting menu screen on the LCD 21. The confirmation button 24 enters the item chosen by the cursor keys 23.

In a side face of the camera body 11, a memory card slot 27 is provided. The memory card 26 is detachably inserted into the memory card slot 27.

Figure 3:
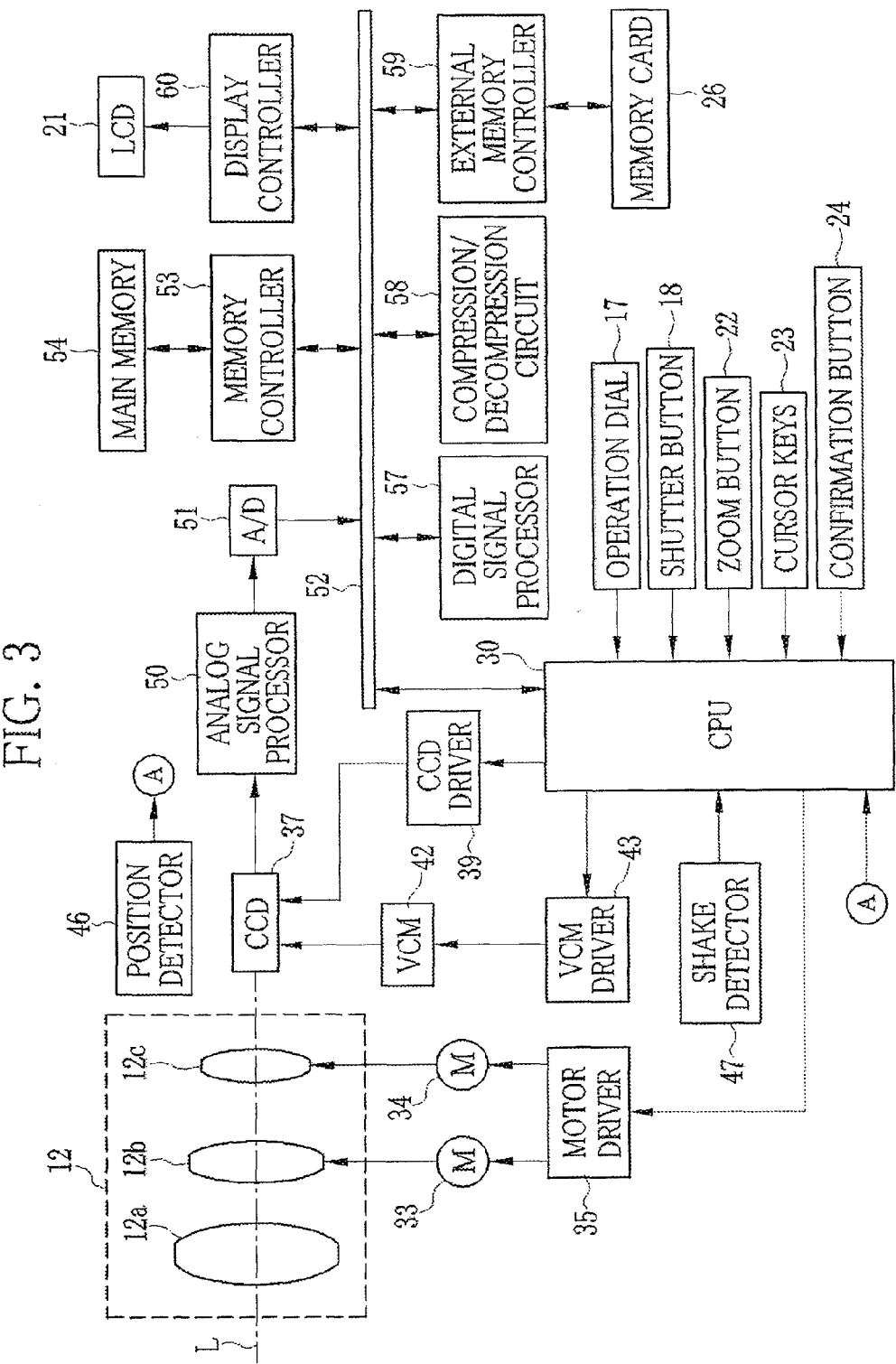
FIG. 3 is a circuit block diagram of the digital still camera.

In FIG. 3, a CPU 30 controls the entire operation of the digital still camera 10. To be more specific, the CPU 30 powers on or off the digital still camera 10, or changes the operation mode thereof in response to rotation of the operation dial 17. The CPU 30 carries out various types of operation in response to a press of the shutter button 18, the cursor keys 23 and the confirmation button 24.

The optical system 12 has a fixed lens group 12a, a zoom lens group 12b, and a focus lens group 12c. The fixed lens group 12a is disposed at the forefront of the lens barrel 13. The zoom lens group 12b and the focus lens group 12c are movably disposed along a photography optical axis "L" of the optical system 12. The zoom lens group 12b is driven by a stepping motor 33, and the focus lens group 12c is driven by a stepping motor 34. The CPU 30 controls the positions of the zoom lens group 12b and the focus lens group 12c via a motor driver 35 (zooming and focusing). Each lens group has a single or plurality of lens elements.

Behind the optical system 12, there is disposed a CCD 37 that rests in a standard position where the center of its imaging surface coincides with the photography optical axis "L". The CPU 30 controls actuation of the CCD 37 via a CCD driver 39. The CCD 37 converts an object image formed by the optical system 12 into an electrical pickup signal. Instead of the CCD 37, a CMOS image sensor or the like may be used.

The CCD 37 is supported by a CCD support mechanism 64, which will be described later on, movably in a plane orthogonal to the photography optical axis "L" in response to a camera shake. The CCD support mechanism 64 has first and second voice coil motors (VCMs) 42. When an X-axis direction (yaw direction) refers to a horizontal direction of the digital still camera 10, and a Y-axis direction (pitch direction) refers to a vertical direction thereof, the first VCM 42 shifts the CCD 37 in the Y-axis direction, and the second VCM 42 shifts the CCD 37 in the X-axis direction. The CPU 30 controls the VCMs 42 via VCM drivers 43.

The CCD support mechanism 64 is provided with a position detector 46 for detecting the position of the CCD 37. Position data of the CCD 37 outputted from the position detector 46 is inputted to the CPU 30. A shake detector 47 has two angular velocity sensors for detecting the X-axis and Y-axis camera shakes applied to the digital still camera 10. Shake data from the shake detector 47 is inputted to the CPU 30. Instead of the angular velocity sensors, accelerometers may be used as the shake detector 47.

The CCD support mechanism 64, the VCMs 42, the position detector 46 and the shake detector 47 compose an image stabilizer. In a shake correction mode, the CPU 30 performs feedback control of the VCMs 42 based on the shake data from the shake detector 47 and the position data from the position detector 46, and shifts the position of the CCD 37 in response to the camera shake for the purpose of suppressing a blur in the object image that is incident on the imaging surface of the CCD 37. Instead of the CPU 30 performing the feedback control by software, the VCM drivers 43 may be provided with differential amplifiers for the feedback control.

The pickup signal from the CCD 37 is inputted to an analog signal processor 50, and subjected to analog signal processing including gain correction, correlated double sampling and the like. The pickup signal outputted from the analog signal processor 50 is inputted to an A/D converter 51, and converted into a digital signal. The digital pickup signal from the A/D converter 51 is transmitted through a bus 52, and written to a main memory 54 as the image data by a memory controller 53.

The memory controller 53 reads out the image data from the main memory 54 based on a command from the CPU 30 connected to the bus 52. In addition to the A/D converter 51, the memory controller 53 and the CPU 30, a digital signal processor 57, a compression/decompression circuit 58, an external memory controller 59 and a display controller 60 are connected to the bus 52.

The digital signal processor 57 applies predetermined image processing such as YC conversion, gamma correction, contour correction and white balance correction to the image data read from the main memory 54. The compression/decompression circuit 58 applies predetermined compression processing such as JPEG compression to the image data outputted from the digital signal processor 57. The external memory controller 59 writes or reads the image data to or from the memory card 26 loaded in the memory card slot 27. The display controller 60 displays the image data, the setting menu screen or the like on the LCD 21.

In a still image photographing mode, a field image (moving image) is read from the CCD 37 at a predetermined readout rate, and temporarily written to the main memory 54 as image data. The image data of the main memory 54 is subjected to the image processing by the digital signal processor 57, and sent to the display controller 60. Accordingly, a live image or a through image taken by the CCD 37 is displayed on the LCD 21.

After framing a picture while seeing the through image on the LCD 21, the shutter button 18 is half pressed. In response to the half press, an exposure amount (shutter speed and aperture stop value) is determined and focusing of the optical system 12 is automatically obtained. If the shutter button 18 is fully pressed, a still image is taken under the exposure amount. In this still image photography, a frame image is read from the CCD 37, and written to the main memory 54. The image data stored on the main memory 54 is subjected to the image processing by the digital signal processor 57 and to the compression processing by the compression/decompression circuit 58. The image data of the still image after the compression processing is written to the memory card 26 by the external memory controller 59. After taking the still image, another through image is displayed on the LCD 21 as a preparation for taking the next still image.

If the digital still camera 10 is put into the playback mode, the image data is read out from the memory card 26, and subjected to decompression processing by the compression/decompression circuit 58. The decompressed image data is sent to the display controller 60, so that the playback still image is displayed on the LCD 21. Operation of frame advance buttons changes the still image displayed on the LCD 21 frame-by-frame. By zooming operation, a part of the still image is displayed under magnification. If the digital still camera 10 is put into a moving image photographing mode, a moving image is taken for a lapse of predetermined time in response to the operation of the shutter button 18, and moving image data is stored on the memory card 26.

Figure 4:
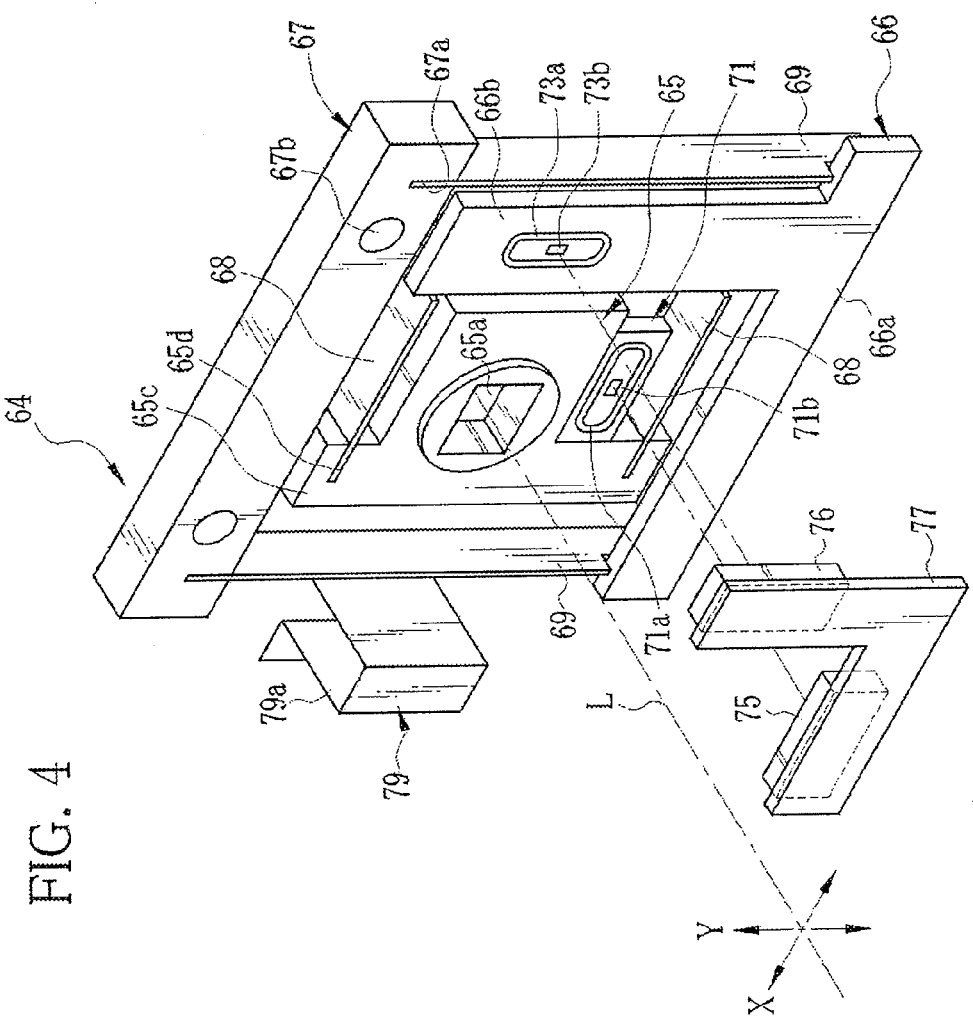
FIG. 4 is a front perspective view of a CCD support mechanism according to a first embodiment.
Figure 5:
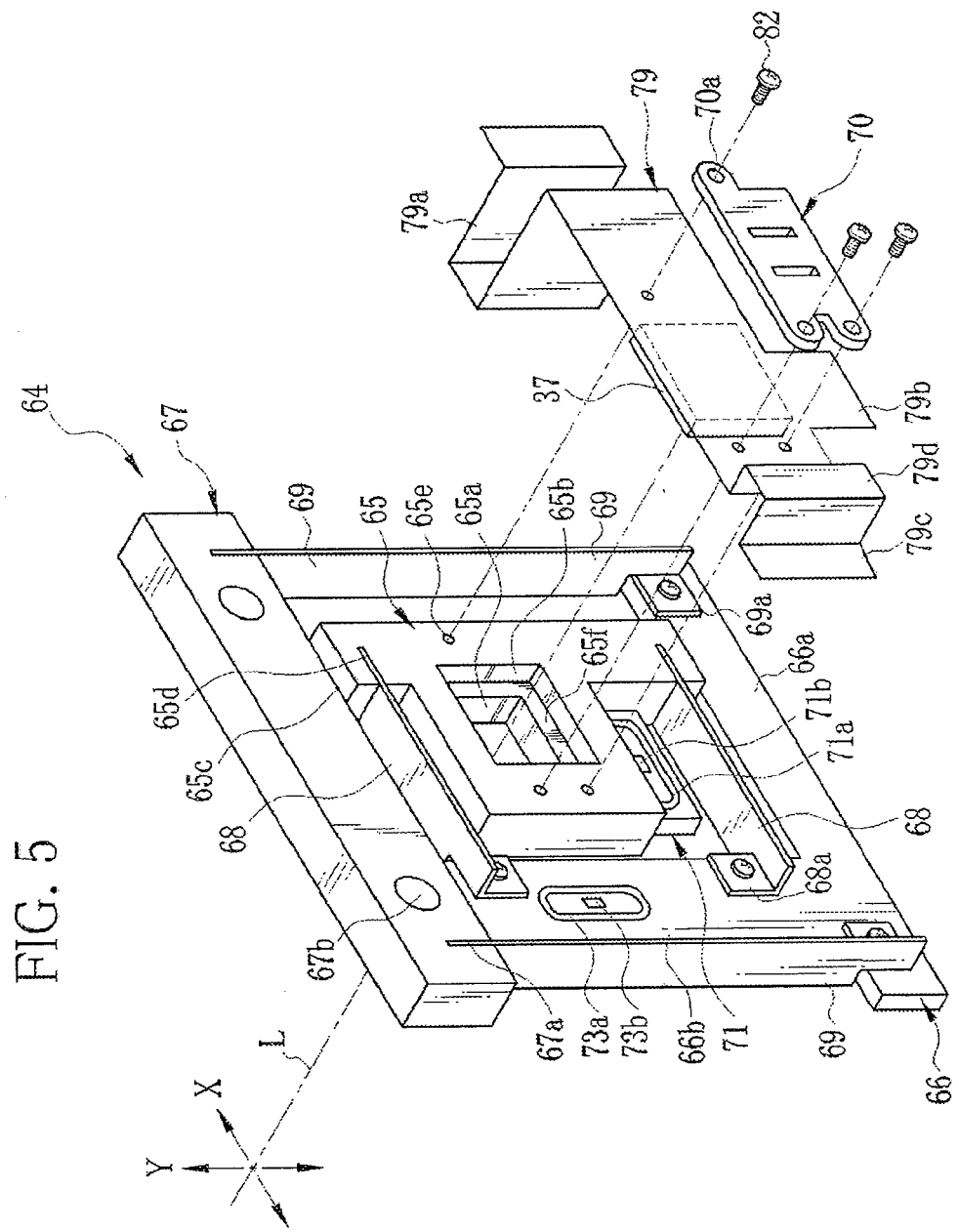
FIG. 5 is a rear perspective view of the CCD support mechanism.

As shown in FIGS. 4 and 5, the CCD support mechanism 64 is constituted of a CCD holder (optical element holder) 65, a first printed circuit board 71, a second printed circuit board 66, a base block 67, a pair of horizontal leaf springs 68 disposed in parallel with each other along the X-axis direction, a pair of vertical leaf springs 69 disposed in parallel with each other along the Y-axis direction, and a retainer 70. The first printed circuit board 71 is attached to a bottom face of the CCD holder 65.

The CCD holder 65 holds the CCD 37, and is movable in the plane orthogonal to the photography optical axis "L". The CCD holder 65 is made of plastic into a plate shape, and has a rectangular exposure opening 65a in its front face. In a rear face of the CCD holder 65, a hollow section 65b is formed so as to be coupled to the exposure opening 65a. The CCD 37 is fitted into the hollow section 65b.

Prismatic leaf spring receiving sections 65c project along the Y-axis from top and bottom faces of the CCD holder 65. In a side face of each leaf spring receiving section 65c, a slit 65d is formed along the X-axis. One end of the horizontal leaf spring 68 is tightly fitted into the slit 65d.

The approximately L-shaped second printed circuit board 66 has a horizontal section 66a extending in the X-axis direction, and an erected section 66b erected in the Y-axis direction. To the erected section 66b, the other end of each horizontal leaf spring 68 is screwed. To both ends of the horizontal section 66a, an end of each vertical leaf spring 69 is screwed. The horizontal leaf springs 68 and the vertical leaf springs 69 have the functions of guiding the CCD 37 in response to the camera shake and returning the CCD 37 to the standard position upon stopping the camera shake. This structure obviates the need for guide shafts, and hence contributes downsizing of the image stabilizer.

The base block 67 is made of plastic into a bar shape, and is disposed horizontally in the camera body 11. Two slits 67a are formed in a bottom face of the base block 67, and the other end of each vertical leaf spring 69 is inserted into the slit 67a along the Y-axis. The base block 67 has two attachment holes 67b that penetrate in a front-back direction. The base block 67 is fixed to the camera body 11 or the lens barrel 13 through the attachment holes 67b.

The horizontal leaf springs 68 are, for example, approximately rectangular metal leaf springs. These horizontal leaf springs 68 are disposed in parallel with each other. One end of each horizontal leaf spring 68 is fitted into the slit 65d of the CCD holder 65. The other end of the horizontal leaf spring 68 is provided with an attachment part 68a that is screwed onto the second printed circuit board 66.

The pair of horizontal leaf springs 68 is bent in the Y-axis direction in the plane orthogonal to the photography optical axis "L", while a first printed coil 71a is energized to shift the CCD holder 65 in the Y-axis direction for correction of the camera shake. The horizontal leaf springs 68 are processed with high precision so that an amount of deflection in the direction of the photography optical axis "L" is of the order of micrometers.

The vertical leaf springs 69 are rectangular metal leaf springs that are longer than the horizontal leaf springs 68. These vertical leaf springs 69 are disposed in parallel with each other. One end of each vertical leaf spring 69 is fitted into the slit 67a of the base block 67. The other end of the vertical leaf spring 69 is provided with an attachment part 69a that is screwed onto the second printed circuit board 66.

The pair of vertical leaf springs 69 is bent in the X-axis direction in the plane orthogonal to the photography optical axis "L", while a second printed coil 73a is energized to shift the second printed circuit board 66 in the X-axis direction for correction of the camera shake. The vertical leaf springs 68 are processed with high precision so that an amount of deflection in the direction of the photography optical axis "L" is of the order of micrometers.

Figure 6A:
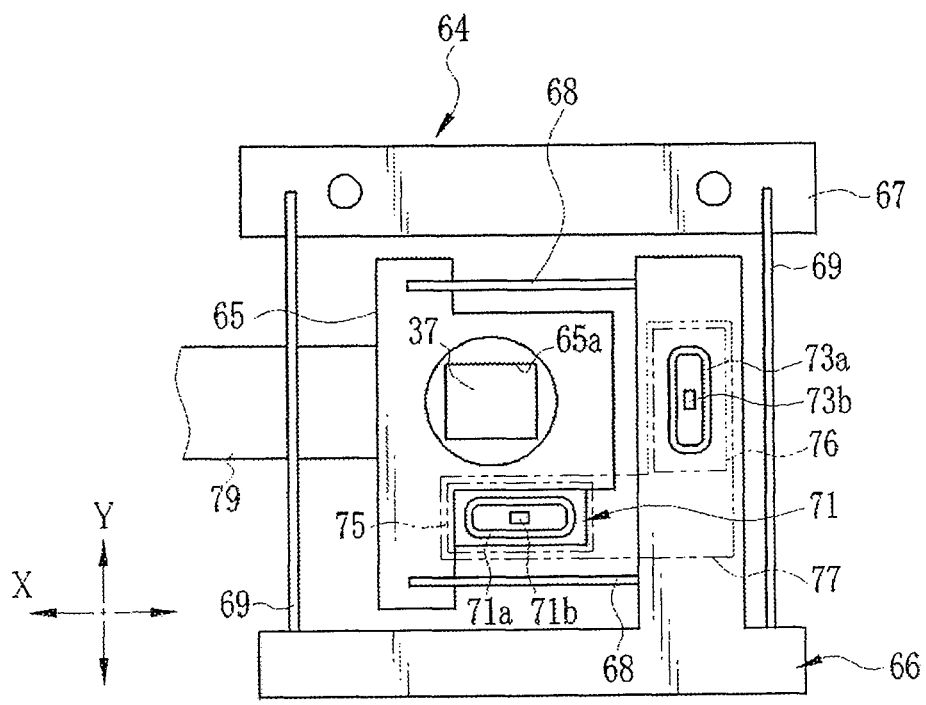
FIG. 6A is a front view of the CCD support mechanism before a camera shake.

On the first printed circuit board 71, the approximately loop-shaped first printed coil 71a and a first Hall element 71b positioned at the center of the first printed coil 71a are disposed. In a like manner, the approximately loop-shaped second printed coil 73a and a second Hall element 73b are disposed on the second printed circuit board 66. As shown in FIG. 6A, a first stationary magnet 75 is disposed so as to face the first printed coil 71a. A second stationary magnet 76 is disposed so as to face the second printed coil 73a. The first printed coil 71a and the first stationary magnet 75 compose the Y-axis VCM 42 for shifting the CCD 37 in the Y-axis direction. The second printed coil 73a and the second stationary magnet 76 compose the X-axis VCM 42 for shifting the CCD 37 in the X-axis direction.

The X-axis and Y-axis VCMs 42 are of well-known flat-coil type. The first stationary magnet 75 generates a magnetic field around the first printed coil 71a, and the second stationary magnet 76 generates a magnetic field around the second printed coil 73a. The first stationary magnet 75 and the second stationary magnet 76 are attached to a common L-shaped yoke 77, so that the number of yokes is reduced from two to one.

When the VCM driver 43 feeds an electric current through the first printed coil 71a in the magnetic field of the first stationary magnet 75, a Lorentz force is generated in the Y-axis direction. When the VCM driver 43 feeds an electric current through the second printed coil 73a in the magnetic field of the second stationary magnet 76, in a like manner, a Lorentz force is generated in the X-axis direction. The directions of the Lorentz forces depend on the directions of the electric currents flowing through the first and second printed coils 71a and 73a, and the magnitude of the Lorentz forces depends on current values.

The Lorentz force generated by the first printed coil 71a shifts the CCD holder 65 in the Y-axis direction while bending the horizontal leaf springs 68. Likewise, the Lorentz force generated by the second printed coil 73a shifts the second printed circuit board 66 and the CCD holder 65 in the X-axis direction while bending the vertical leaf springs 69.

Figure 6B:
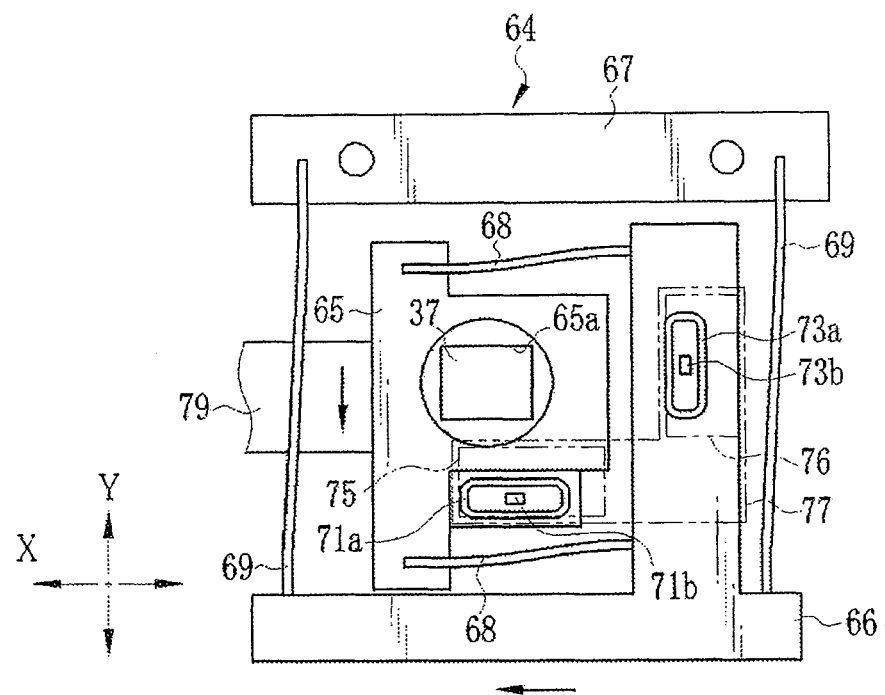
FIG. 6B is a front view of the CCD support mechanism after the camera shake.

The first Hall element 71b, the second Hall element 73b, the first stationary magnet 75 and the second stationary magnet 76 compose the position detector 46. The first Hall element 71b outputs a detection signal in accordance with magnetic field strength of the first stationary magnet 75. The second Hall element 73b outputs a detection signal in accordance with magnetic field strength of the second stationary magnet 76. As shown in FIG. 6B, when the CCD holder 65 is shifted in the negative Y-axis direction to counteract the camera shake, the first Hall element 71b detects variation in the magnetic field strength of the first stationary magnet 75. Thus, it is possible to calculate the position of the CCD 37 in the Y-axis direction relative to the standard position. In a like manner, when the second printed circuit board 66 is shifted in the positive X-axis direction, the second Hall element 73b detects variation in the magnetic field strength of the second stationary magnet 76, so that the position of the CCD 37 in the X-axis direction can be calculated.

As shown in FIG. 5, the CCD 37 is fitted into the hollow section 65b from the side of the imaging surface. A rear face of the CCD 37 is attached to a flexible printed circuit (FPC) 79 for electrically connecting the CCD 37 to a main circuit board having the CPU 30, the CCD driver 39, the VCM drivers 43 and the like. The FPC 79 includes a flexion 79a that has a plurality of flexed portions to facilitate the smooth shift of the CCD holder 65.

The FPC 79 includes integrally formed connection sections 79b and 79c. The connection section 79c has a flexion 79d having a plurality of flexed portions. The connection section 79b is electrically connected to the first printed circuit board 71, and the connection section 79c is connected to the second printed circuit board 66. Accordingly, the first printed coil 71a, the second printed coil 73a, the first Hall element 71b and the second Hall element 73b are electrically connected to the VCM drivers 43 and the CPU 30 on the main circuit board.

The retainer 70 is fastened to the CCD holder 65 with screws 82 through three holes 70a and screw holes 65e of the CCD holder 65. The retainer 70 presses the front face of the CCD 37 from behind through the FPC 79 against a positioning surface 65f in the hollow section 65b.

Figure 7:
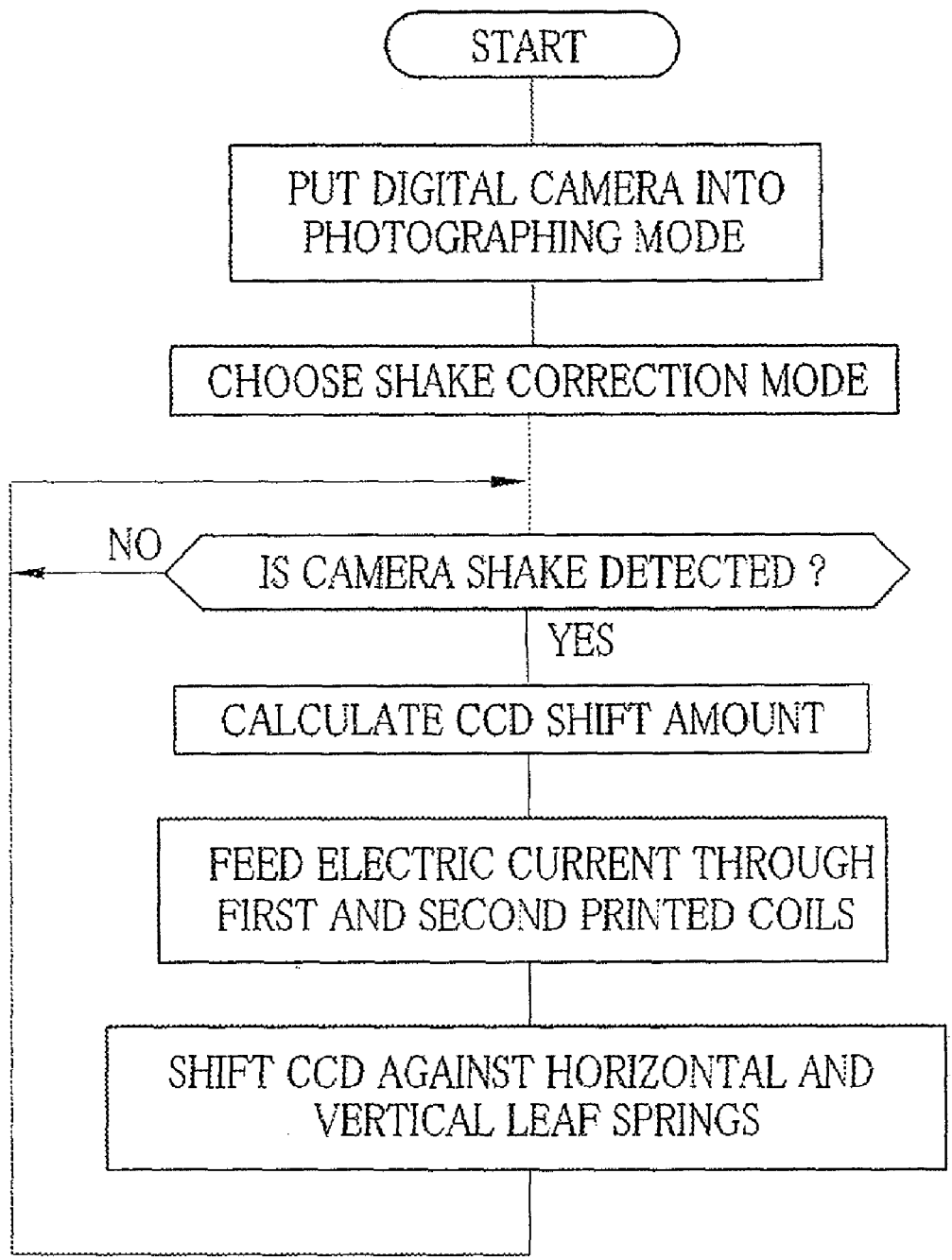
FIG. 7 is a flowchart of a shake correction mode.

Referring to FIG. 7, the operation of the foregoing embodiment will be described. To take a still image, the digital still camera 10 is put into the photographing mode by operation of the operation dial 17. To prevent an image blur by hand-held shooting, the shake correction mode is also chosen. The shake correction mode is not selectable in the playback mode.

While the camera shake does not occur, the horizontal leaf springs 68 and the vertical leaf springs 69 are straight as shown in FIG. 6A. In this case, the CCD 37 held by the CCD holder 65 is maintained in the standard position where the center of the CCD 37 is aligned with the photography optical axis "L".

Upon occurrence of the camera shake, the shake detector 47 attached to the lens barrel 13 or the camera body 11 is quickly actuated. The shake detector 47 outputs detection signals (X-axis angular velocity and Y-axis angular velocity) that represent magnitude of the camera shakes in X-axis (yaw) and Y-axis (pitch) directions, and sends the detection signals to the CPU 30. The CPU 30 calculates target shift amounts of the CCD in each of the X-axis and Y-axis directions, based on integration values of individual angular velocities. These target shift amounts are sent to the VCM drivers 43.

The VCM drivers 43 have an X-axis differential amplifier and a Y-axis differential amplifier. Each differential amplifier performs feedback control of the position of the CCD 37, by using the target shift amount as a target value and a present position as a measurement value. The Y-axis present position of the CCD 37 is detected by the first Hall element 71b, and the X-axis present position thereof is detected by the second Hall element 73b.

In response to occurrence of the camera shake, the target shift amounts are calculated in accordance with the X-axis and Y-axis angular velocities. Since the CCD 37 is in the standard position at this point, the VCM drivers 43 feed large electric currents through the printed coils 71a and 73a at the beginning of the camera shake, to generate large Lorentz forces between the printed coil 71a and the stationary magnet 75 and between the printed coil 73a and the stationary magnet 76. The Lorentz forces, as shown in FIG. 6B, lead to shift the CCD holder 65 in the opposite direction of the camera shake, while elastically bending the horizontal leaf springs 68 or the vertical leaf springs 69. The shift of the CCD holder 65 brings about a change in the present position. Thus, the difference between the target shift amount and the present position becomes smaller, and the electric currents flowing through the printed coils 71a and 73a are reduced. The shift of the CCD holder 65 counteracts a shift of an image formed on the CCD 37 due to the camera shake, and hence a sharp still image without a blur is captured.

When the horizontal leaf springs 68 are bent in the Y-axis direction, the CCD holder 65 is slightly shifted in the X-axis direction too, but the X-axis shift amount is of the order of micrometers. Accordingly, there is no harm in energizing only the first printed coil 71a in response to the Y-axis camera shake. Likewise, when the vertical leaf springs 69 are bent in the X-axis direction, the second printed circuit board 66 is slightly shifted in the Y-axis direction too, but the Y-axis shift amount is negligible. Accordingly, in response to the X-axis camera shake, only the second printed coil 73a is energized to correct an image blur.

Upon stopping the camera shake, the target shift amount becomes "0", and hence the VCM drivers 43 feed electric currents of opposite direction through one or both of the printed coils 71a and 73a to return the CCD 37 to the standard position. At this time, the elasticity of the horizontal leaf springs 68 or/and the vertical leaf springs 69 contribute to the CCD return. When the CCD 37 has returned to the standard position, the target shift amounts and the present position become "0", and thus the VCM drivers 43 stop energizing the printed coils 71a and 73a. Then, the CCD 37 is maintained in the standard position by the horizontal leaf springs 68 and the vertical leaf springs 69.

The camera shake tends to occur during a press of the release button 18 in a state of holding the digital still camera 10 with hands. The image stabilizer shifts the CCD 37 while detecting the camera shake so as not to move the image on the CCD 37, and allows capturing the sharp still image without the image blur.

In the CCD support mechanism 64 according to the present invention, since the CCD 37 is held by only the pairs of horizontal leaf springs 68 and vertical leaf springs 69, there is no problem of friction or wobble during the shift of the CCD 37. Thus, it is possible to provide the image stabilizer with high followability to the VCMs 42. The pairs of horizontal leaf springs 68 and vertical leaf springs 69 that are flexible in the plane orthogonal to the photography optical axis "L" obviate the need for a slider and guide shafts, and hence contribute reduction in the thickness of the digital still camera 10 in the direction of the photography optical axis "L".

The image stabilizer is reduced in size, because the second printed circuit board 66 composes a part of the VCM 42 and the position detector 46. Since the CCD support mechanism 64 does not structurally wobble during the shift of the CCD holder 65, it is possible to detect the position of the CCD holder 65 with high precision, if the first Hall element 71b is disposed in the first printed circuit board 71 and the second Hall element 73b is disposed in the second printed circuit board 66.

Second Embodiment

The VCMs 42 of the first embodiment are of the so-called moving coil type, in which a coil is attached to a movable element, but VCMs of moving magnet type, in which a magnet is attached to the movable element, are available instead. In the following second embodiment, the VCMs of moving magnet type are used. Detailed description of components identical or similar to those of the first embodiment will be omitted.

Figure 8:
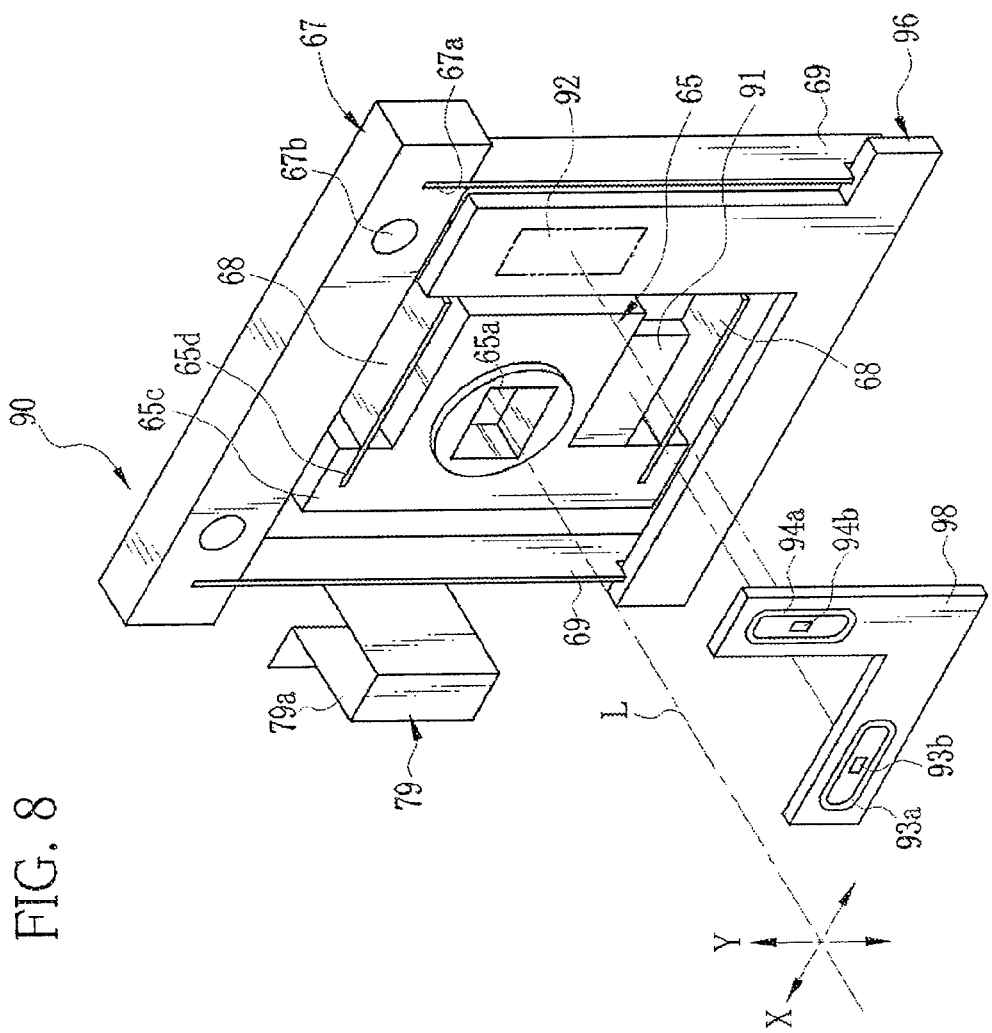
FIG. 8 is a front perspective view of a CCD support mechanism according to a second embodiment.

In a CCD support mechanism 90 shown in FIG. 8, a first drive magnet 91, instead of the first printed circuit board 71, is attached to the bottom face of the CCD holder 65. Instead of the second printed circuit board 66, a second drive magnet 96 having a magnetized section 92 is used. In front of the first drive magnet 91 and the magnetized section 92, a third printed circuit board 98 having a third printed coil 93a, a third Hall element 93b, a fourth printed coil 94a and a fourth Hall element 94b is disposed. In the camera body 11, the third printed coil 93a and the third Hall element 93b face the first drive magnet 91, and the fourth printed coil 94a and the fourth Hall element 94b face the magnetized section 92.

The CCD holder 65 and the second drive magnet 96 are shifted by a Y-axis Lorentz force generated by the first drive magnet 91 and the third printed coil 93a and an X-axis Lorentz force generated by the magnetized section 92 and the fourth printed coil 94a. The third Hall element 93b detects magnetic variation by the displacement of the first drive magnet 91, and the fourth Hall element 94b detects magnetic variation by the displacement of the magnetized section 92, so as to detect the shift of the CCD 37 in the X-axis and Y-axis directions.

The second embodiment has the same effects as the first embodiment. In addition, since the third and fourth printed coils 93a and 94a and the third and fourth Hall elements 93b and 94b are disposed in the third printed circuit board 98 that is fixed to the camera body 11, these printed coils 93a and 94a and Hall elements 93b and 94b are easily connectable to the FPC 79. Reduction in the number of connection points between the CCD holder 65 and the FPC 79 prevents the deformed FPC 79 from obstructing the smooth shift of the CCD holder 65 and the second drive magnet 96.

In the foregoing first and second embodiments, the vertical leaf springs hold the horizontal leaf springs, but the horizontal leaf springs may hold the vertical leaf springs instead. The image stabilizer of the present invention is applicable to various types of optical instruments including a silver halide camera and a telescope, in addition to the digital still camera.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image stabilizer used in an optical instrument, comprising:
a base block fixed to the optical instrument;
an optical element holder for holding an optical element disposed on an optical axis of the optical element;

a first printed circuit board attached to the optical element holder, for having a first printed coil;

a second printed circuit board disposed outside the optical element holder, for having a second printed coil;

a pair of first leaf springs disposed in parallel with each other and elastically deformable in a first direction in a plane orthogonal to the optical axis, each of the first leaf springs being fixed to the optical element holder at an end and to the second printed circuit board at the other end;

a pair of second leaf springs disposed in parallel with each other and elastically deformable in a second direction transverse to the first direction in the plane orthogonal to the optical axis, each of the second leaf springs being fixed to the second printed circuit board at an end and to the base block at the other end;

a first stationary magnet fixed to the optical instrument, for generating a magnetic field around the first printed coil, when an electric current is fed through the first printed coil in the magnetic field of the first stationary magnet, the optical element holder being shifted while bending the first leaf springs so that the optical element is shifted to counteract a shake in the first direction; and a second stationary magnet fixed to the optical instrument, for generating a magnetic field around the second printed coil, when an electric current is fed through the second printed coil, the second printed circuit board being shifted while bending the second leaf springs so that the optical element is shifted to counteract a shake in the second direction.

2. The image stabilizer according to claim 1, wherein
the first stationary magnet is disposed in front of the first printed coil in the optical instrument; and
the second stationary magnet is disposed in front of the second printed coil in the optical instrument.

3. The image stabilizer according to claim 2, further comprising:

a shake detector for detecting the shake of the optical instrument;

a position detector for detecting a position of the optical element; and a controller for controlling the electric current flowing through the first printed coil or the second printed coil based on a signal from the shake detector and a position signal from the position detector.

4. The image stabilizer according to claim 3, wherein the position detector comprises:

a first magnetometer disposed on the first printed circuit board, for detecting a strength and a direction of the magnetic field of the first stationary magnet;

a second magnetometer disposed on the second printed circuit board, for detecting a strength and a direction of the magnetic field of the second stationary magnet; and a processor circuit for calculating the position of the optical element in the first direction from an output signal of the first magnetometer, and for calculating the position of the optical element in the second direction from an output signal of the second magnetometer.

5. The image stabilizer according to claim 4, wherein the first and second magnetometers are Hall elements.

6. The image stabilizer according to claim 1, further including a yoke that is fixed to the optical element, to the yoke the first and second stationary magnets being attached.

7. The image stabilizer according to claim 1, wherein the optical element is an image sensor.

8. An optical instrument having the image stabilizer according to claim 1.

9. An image stabilizer used in an optical instrument, comprising:

a base block fixed to the optical instrument;

an optical element holder for holding an optical element disposed on an optical axis of the optical instrument;

a first drive magnet attached to the optical element holder;

a second drive magnet disposed outside the optical element holder;

a pair of first leaf springs disposed in parallel with each other and elastically deformable in a first direction in a plane orthogonal to the optical axis, each of the first leaf springs being fixed to the optical element holder at an end and to the second drive magnet at the other end;

a pair of second leaf springs disposed in parallel with each other and elastically deformable in a second direction transverse to the first direction in the plane orthogonal to the optical axis, each of the second leaf springs being fixed to the second drive magnet at an end and to the base block at the other end;

a third printed circuit board fixed to the optical instrument;

a third printed coil disposed on the third printed circuit board and in a magnetic field of the first drive magnet, when an electric current is fed through the third printed coil, the optical element holder being shifted while bending the first leaf springs so that the optical element is shifted to counteract a shake in the first direction; and a fourth printed coil disposed on the third printed circuit board and in a magnetic field of the second drive magnet, when an electric current is fed through the fourth printed coil, the second drive magnet being shifted while bending the second leaf springs so that the optical element is shifted to counteract a shake in the second direction.

10. The image stabilizer according to claim 9, wherein the second drive magnet has a magnetized section disposed in front of the fourth printed coil, and the magnetized section generates the magnetic field around the fourth printed coil.

11. The image stabilizer according to claim 9, further comprising a position detector, wherein the position detector comprises:

a third magnetometer disposed on the third printed circuit board, for detecting a strength and a direction of the magnetic field of the first drive magnet;

a fourth magnetometer disposed on the third printed circuit board, for detecting a strength and a direction of the magnetic field of the second drive magnet; and a processor circuit for calculating a position of the optical element in the first direction from an output signal of the third magnetometer, and for calculating the position of the optical element in the second direction from an output signal of the fourth magnetometer.

12. An optical instrument having the image stabilizer according to claim 9.

* * * * *